United States Patent [19]

Bellows et al.

[11] 4,285,794
[45] Aug. 25, 1981

[54] ANNULAR ELECTRODES FOR SHUNT CURRENT ELIMINATION

[75] Inventors: Richard J. Bellows; Patrick G. Grimes, both of Westfield; Chester W. Elspass, Plainfield, all of N.J.

[73] Assignee: Exxon Research & Engineering Co., Florham Park, N.J.

[21] Appl. No.: 122,706

[22] Filed: Feb. 19, 1980

[51] Int. Cl.³ .......................... C25B 9/04; C25C 7/00; C25B 11/00; C25B 11/12
[52] U.S. Cl. .................................. 204/260; 204/263; 204/269; 204/272; 204/295; 204/296; 204/290 F; 204/294; 204/282; 429/101
[58] Field of Search ............... 204/260, 272, 275, 280, 204/290 R, 290 F, 294, 282–283, 255, 257, 263, 269; 429/101

[56] References Cited

U.S. PATENT DOCUMENTS

| 1,404,387 | 1/1922 | Green ................................... 204/260 |
| 1,842,703 | 1/1932 | Vorce ................................... 204/260 |
| 2,163,793 | 6/1939 | Logan .............................. 204/260 X |
| 2,228,264 | 1/1941 | Freedley .......................... 204/283 X |
| 2,807,577 | 9/1957 | Antonsen ......................... 204/260 X |
| 4,048,045 | 9/1977 | Eng et al. ............................. 204/263 |
| 4,081,585 | 3/1978 | Jacquelin ............................... 429/23 |
| 4,136,232 | 1/1979 | Durand .................................. 429/15 |
| 4,197,169 | 4/1980 | Zahn et al. ....................... 204/228 X |

OTHER PUBLICATIONS

M. Tadayuki et al. "Prevention of Electrolytic Corrosion of an Aqueous Alkali Chloride Electrolysis Cell," C. A. 89:170987g, vol. 89, (1978).

*Primary Examiner*—Donald R. Valentine
*Attorney, Agent, or Firm*—Robert S. Salzman

[57] ABSTRACT

Shunt currents can be eliminated in electrochemical devices by introducing nulling currents via auxilary electrodes. In electrochemical devices including those having a circulating electrolyte, such electrodes are designed to have a generally annular shape in order to provide a substantially uniform current density profile along a common electrolyte carrying manifold. The uniform current density profile allows for the elimination of these harmful shunt currents with a minimum of power consumption.

17 Claims, 6 Drawing Figures

TAPERED

CURVED

IRREGULAR

ANNULAR ELECTRODES FOR SHUNT CURRENT ELIMINATION

FIELD OF THE INVENTION

This invention pertains to the reduction or elimination of undesirable shunt currents in electrochemical devices such as battery systems, and, more particularly, to an improved protective electrode in an electrochemical device for applying nulling voltages to reduce or eliminate the shunt currents.

BACKGROUND OF THE INVENTION

In electrochemical devices of all kinds, and, in particular, those battery systems having a plurality of cells immersed in a common electrolyte, shunt current losses are known to result from conductive current bypass paths which occur in the electrolyte surrounding the cells. Such shunt current losses are always present in these devices during charging, discharging and under open circuit conditions, and have undesirable side effects leading to the shortening of their useful life.

In a patent application assigned to a common assignee, by M. Zahn, P. G. Grimes, and R. J. Bellows, entitled, "SHUNT CURRENT ELIMINATION AND DEVICE", Ser. No. 939,325, filed Sept. 5, 1978, now U.S. Pat. No. 4,197,169, a method for eliminating shunt currents is described wherein a protective nulling current is applied through the common electrolyte disposed in a common manifold. The present invention is based upon the teachings set forth in the above-mentioned application, and is meant to incorporate these teachings herein by way of reference.

In the course of applying these protective currents, particularly in systems featuring circulating electrolyte, electrodes are required which would not block or impede the flow of electrolyte through the manifold system. One of the simplest and most effective electrode designs from a hydraulic point of view is a thin wire electrode disposed in the center of the flow stream. These electrodes prevent substantial pressure drops. This type of electrode applies the current at a point or focused source, and, therefore, provides a non-uniform current density profile in the manifold in the proximity of the electrode, which current density eventually spreads along the length of the manifold. Devices which show a point source or focused current electrode structure are to be seen in the patents to P. Durand, entitled "ELECTROCHEMICAL GENERATORS WITH AUXILIARY CATHODE", U.S. Pat. No. 4,136,232, issued Jan. 23, 1979, and J. Jacquelin, entitled "FORCED FLOW ELECTROCHEMICAL BATTERY", U.S. Pat. No. 4,081,585, issued Mar. 28, 1978.

The Jacquelin and Durand electrodes are constructed in this fashion in order to generate finite amounts of zinc metal, which are easily washed away in the electrolyte stream. The non-uniformity of the current density with the use of a point source electrode along the manifold will produce a voltage drop at each cell position which does not equal the shunt voltage. The shunt currents would, therefore, not be effectively reduced using these electrodes.

The invention first contemplated the use of a screen or mesh type electrode for allowing a generally unimpeded fluid flow, while also providing a substantially uniform current density to be applied through the manifold. While such an electrode structure would work well in some cases, it was impractical where the electrode would be required to supply reactants to the electrolyte solution, or remove certain undesirable products therefrom. For example, in an electrolysis cell, the need to remove oxygen build-up in the hydrogen production electrolyte is desirable to prevent the possibility of an explosion. Also, in certain situations, the pressure drop in the fluid caused by screens is undesirable.

After careful assessment of all the feasible electrode designs, the use of an annular-type of electrode was deemed to be the most practical. The annular electrode does not impede or block fluid flow in those systems or parts of systems using circulating electrolyte, and at the same time will allow for the application of a protective current about the manifold which provides a substantially uniform current density profile through the electrolyte along the manifold.

In addition, the annular electrode can be provided with means to inject or remove its reactants and/or its products from the electrolyte.

As a further advantage of applying a protective current about the manifold, which current has a uniform current density profile, there is a reduction of the power required to maintain the nulling current.

The reduction in power consumption with the use of an annular electrode structure is made possible by the fact that other electrode designs require that the electrodes be placed at a greater distance along the manifold from the individual current producing cells. This greater distance is necessary to allow the lines of current from the point source to radially spread-out into the manifold, so as to provide a proper nulling match with the shunt voltage at each cell position. Because the currents have to travel through a greater electrolyte distance with the use of a point source electrode, a greater voltage boost or power consumption is required for these point or focused electrode designs. Annular electrodes which put forth a substantially uniform pattern of current lines in the manifold can be placed closer to the cells, thus requiring less power.

In addition, since impressed electrode voltage is also a function of current density, the design of electrodes with a greater surface area, as available with annular electrode designs, is also desirable from a current density and power standpoint.

BRIEF DESCRIPTION OF THE INVENTION

The present invention is directed to an electrochemical device comprising at least one common manifold fluidically communicating with a plurality of series connected cells. The manifold carries the electrolyte which provides an electrical electrolyte conductive bypass path around the cells. This bypass path is capable of resulting in undesirable shunt currents.

At least one annular protective electrode which is supported by the manifold applies a protective current about the manifold which has a substantially uniform current density profile through the electrolyte along the manifold. This uniform current density profile will effectively reduce or eliminate shunt currents while minimizing the power consumed to do so.

With respect to the above description of the invention, it is meant by "annular electrode", all those electrode designs or structures having a generally surrounding radial cross-section with respect to the manifold, such as a circular, oval, or polygonal inner wall cross-section. In addition, the annular electrode may have an axial cross-sectional shape which is straight, curved, tapered, or irregular. The use of different design shapes befits the required need for contouring the flow of electrolyte and contouring the current density profile to suit the intended purpose. However, the circular radial cross-section, and the tapered axial cross-section is probably the preferred design.

As used above, the term "uniform current density profile" is meant to imply protective current lines which are substantially uniformly spread throughout the cross-section of the electrolyte fluid for substantially the entire length of the manifold, such that the voltage drop opposite each cell is substantially equal to the shunt voltage for that cell position.

As used above, the term electrochemical device may be one of the following: a photoelectrochemical device, a battery (primary or secondary), a fuel cell, a chloralkali cell, an electrowinning device, an electrorefining device, an electrolyzer, an electrochemical reactor, a monopolar or bipolar device, and a device having circulating or non-circulating electrolyte(s).

As used herein, the term "common electrolyte" shall mean an electrolyte which is employed in and distributed to two or more cells, the electrolyte comprising a physical continum. In a circulating electrolyte system using one or more manifolds, the physical continuum includes the electrolyte contained within the manifolds, the branch channels and the cells. In a static electrolyte system, the physical continuum includes the electrolyte in the cells and the connecting areas of electrolyte, e.g., above or around the cells.

As used herein, the term "shared electrolyte" shall mean that portion of the electrolyte which is located in an area of commonality to the electrolyte contained in individual components. Thus, in a circulating electrolyte system using one or more manifolds, the electrolyte contained within manifold(s) is the shared electrolyte and electrolyte contained in branch channels, cells and other individual components is not shared electrolyte. In a static electrolyte system, the shared electrolyte is that electrolyte contained in the header space and/or common base areas of the device and not that electrolyte contained within each cell and within other individual components.

DETAILED DESCRIPTION OF THE INVENTION

The present invention involves a device utilizing the application by an annular electrode of a protective current through an electrical electrolyte conductive bypass path in an opening electrochemical device. The device has a plurality of cells connected, at least in part, in series, and having an electrolyte which is a common electrolyte to at least two such cells and which includes shared electrolyte, whereby an electrical electrolytic conductive bypass path is created around these cells and through said shared electrolyte, resulting in undesirable shunt currents in the absence of said protective current.

Shunt current minimization via a protective current applied by annular electrodes can be employed with an electrochemical device having non-circulating electrolyte(s). The electrolyte can be static, or at least for some time is not being transported or circulated, and this electrolyte is common, i.e., is of a physical continum, to at least two of the cells in series whereby an electrical electrolytic conductive bypass path is created through the electrolyte around the cells having the common electrolyte, resulting in undesirable shunt currents. The conductive bypass path includes shared electrolyte and it may be located at an electrolyte level above the cells, or it may be located through an independent common structural entity such as a base, a fill well or a fill manifold. In any event, the means for applying the protective current constitutes annular electrodes placed at each end of the path in the electrolyte externally from the cells and within the shared electrolyte. The application of the protective current through the path will effectively minimize the shunt currents.

Figure 1:
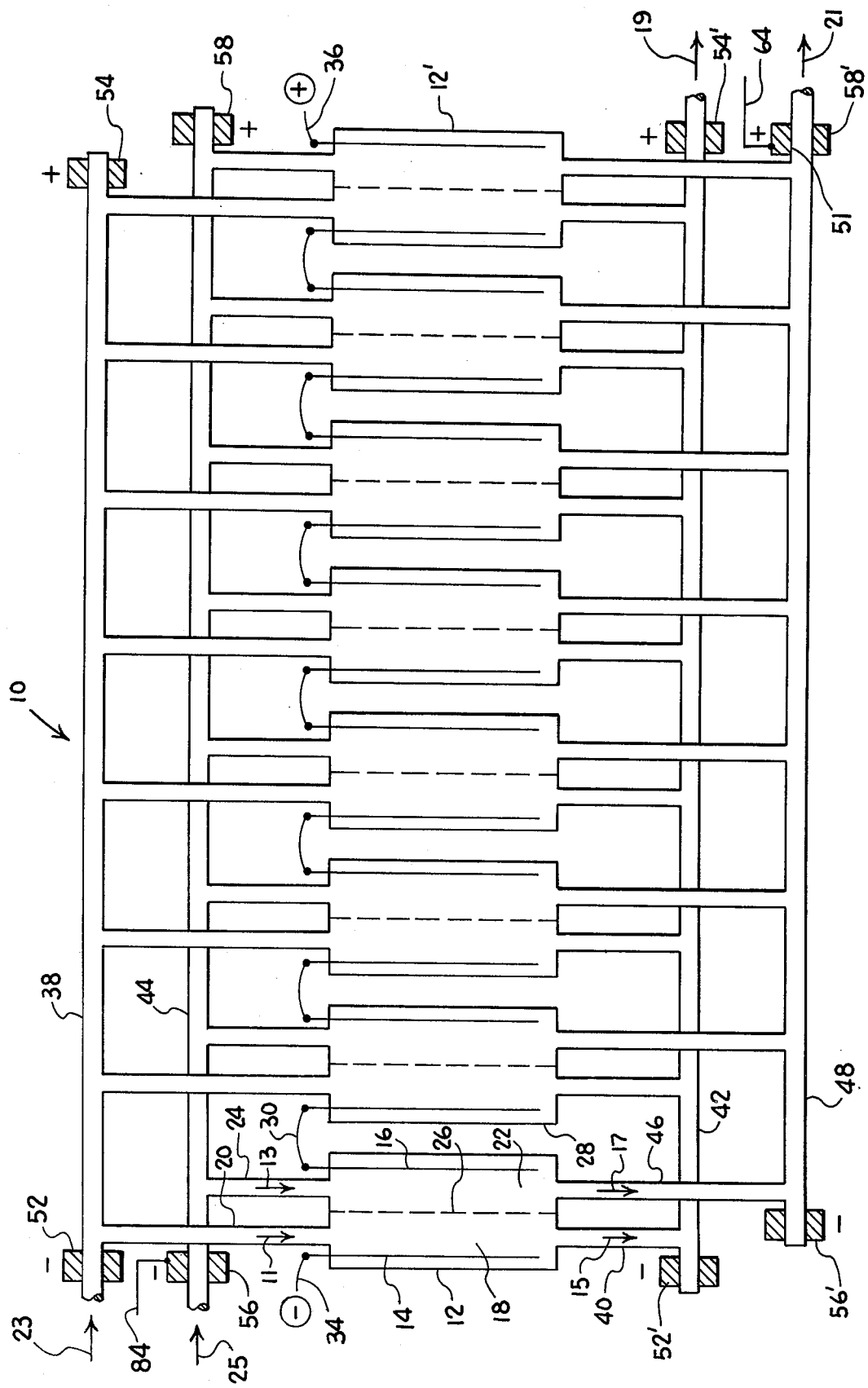
FIG. 1 shows a schematic view of an electrochemical device having a series connected stack of eight monopolar cells and four common manifolds each having two annular electrodes of this invention.

In a preferred embodiment of the present invention, such as illustrated in FIG. 1, the device involves a circulating electrolyte(s) whereby circulation through the device is achieved by one or more manifolds having a circulating common electrolyte, including shared electrolyte, through which the electrical electrolytic conductive bypass path is created, resulting in shunt currents. Annular electrodes are provided for the application of a protective current through one or more manifolds, i.e., through the shared electrolyte portion of the conductive bypass path, to minimize the shunt currents. The protective current provided by the annular electrodes has a substantially uniform density through the shared electrolyte in the manifold(s) and thus acts to minimize the production of shunt currents with a minimum of consumed power through the manifold(s) and through the branch channels connecting the cells to the manifold(s). There is, thus, a conversion from electronic current to electrolytic current. Oxidation/reduction reactions at these electrodes convert the electronic current to an ionic current. Thus, at least in principle, any redox reactions may be used. For example, they could be the same as the reactions at the electrodes of the electrochemical device. Alternatively, other reactions may be used which are compatible chemically and electrically with the electrochemical device.

For example, $H_2$ could be anodically oxidized at one end of the electrochemical device and $H_2$ could be evolved at the other end. The two reactions in acidic solution would be $$H_2 \rightarrow 2H^+ + 2e \text{ (anodic)}$$

and $$2H^+ + 2e \rightarrow H_2 \text{ (cathodic)}$$

The H₂ gas produced could be piped back to the anodic electrode.

In another case, bromide could be oxidized at one electrode and bromine reduced at the other:

$$2Br^- \rightarrow Br_2 + 2e$$

$$2e + Br_2 \rightarrow 2Br^-$$

In another case, O₂ could be oxidized at the anode and reduced at the cathode:

$$O_2 + 4H^+ + 4e \rightarrow 2H_2O$$

$$2H_2O \rightarrow O_2 + 4H^+ + 4e$$

The choice of the redox reactions is dependent on the particular system being protected and could follow standard electrochemistry, as a matter of choice.

It should be noted that the electrochemical device described herein is one in its simplest terms which has a plurality of cells connected, at least in part, in series. However, an electrochemical device of the present invention may be just that or may, on a larger scale, consist of two or more blocks of cells connected electrically in series and have common electrolyte(s) supplied to and removed from the blocks in parallel from major manifolds. Each block of cells may consist of two or more cells in series, with these cells being supplied with electrolyte in parallel from submanifolds in the block of cells. Such systems would have shunt currents within the blocks through the block manifolds and would have shunt currents between the blocks of cells through the main manifolds. These can be minimized with protective currents in the block manifolds and in the main manifolds, as desired.

The application of protective currents through manifolds in general requires the use of two electrodes, one positive and one negative, for electrochemical reactions to insert the current. Factors to be considered are:

Where the reactants are not available (in sufficient quantity) in the electrolyte disposed in the manifold, they must be supplied from an external source. Where the products of the reactions at the protective electrodes are undesirable with respect to the electrolyte, they must be removed.

The annular protective electrodes can be constructed with a liner as will be discussed hereinafter in more detail, which liner allows the ancillary supplying of needed reactants and/or the removal of undesirable products.

The annular protective electrodes illustrated in FIG. 1 as electrodes 52, 52', 54, 56, and 58 may be respectively of both types, as will be explained.

A protective current was employed in accordance with the present invention by means of annular electrodes in conjunction with a stack of series connected zinc-bromine monopolar cells, shown schematically in FIG. 1. In FIG. 1, protective electrodes 52, 56, 54', 58' are disposed within the main electrolyte flow of the system and are of annular construction. Protective electrodes 54, 58, 52', 56' could be planar, i.e., they are not involved in the hydraulics of the system. However, thermal and product considerations may dictate that a flow of electrolyte(s) through these protective electrodes would be desirable. In such a situation, an annular construction could also be used.

This battery device having a series connected stack of eight cells is illustrated generally as 10. Cell 12 is representative of the cells and contains anode electrode 14 and cathode electrode 16. Anolyte flows (arrow 11) into cell 12 at compartment 18 via channel 20, and catholyte flows (arrow 13) into cell 12 at compartment 22 via channel 24. Compartment 18 and compartment 22 are divided by ionically permeable membrane separator 26. Cell 12 is connected in series to the next adjacent cell 28 via electrical connection 30. End cells 12 and 12' contain end terminals 34 and 36, respectively. The anolyte flowing into compartment 18 via channel 20 does so via shared electrolyte manifold 38, which feeds anolyte to all of the cells. The anolyte exits (arrow 15) compartment 18 via channel 40, and through shared electrolyte manifold 42, through which all anolyte exits. The catholyte flowing into compartment 22 via channel 24 does so via shared electrolyte manifold 44, which feeds catholyte to all of the cells. The catholyte exits (arrow 17) compartment 22 via channel 46, and through shared electrolyte manifold 48, through which all catholyte exits.

Annular electrodes 52, 52', 54, 54', 56, 56', 58 and 58' for providing protective currents to this device 10 are typically located on each end of the four manifolds 38, 42, 44 and 48, respectively, and are in contact with the shared electrolyte. Anolyte manifolds 48 and 42 have protective current negative electrodes 52 and 52', respectively, and protective current positive electrodes 54 and 54', respectively. Catholyte manifolds 44 and 48 have protective current negative electrodes 56 and 56', respectively, and positive electrodes 58 and 58', respectively. By way of example, a protective current is applied between negative electrode 52 and positive electrode 54 to effect the protective current through the shared electrolyte across manifold 38, thereby nulling or minimizing shunt currents passing through the conductive bypass path, i.e., passing from the channels connected with manifold 38 and otherwise passing therethrough. Similarly, protective currents are applied across manifolds 42, 44 and 48 through the shared electrolyte.

Both the anolyte and the catholyte are circulated through their respective manifolds, channels and compartments during operation of the device and are recirculated from reservoirs (not shown). As illustrated, the monopolar cells in device 10 are connected electrically in series and hydraulically in parallel. Without application of the protective currents of the present invention, significant shunt currents arise in the channels and manifolds. In this zinc-bromine device, the shunting not only results in loss of capacity and consumption of components, but also causes the growth of zinc at various points on the electrode near where the anolyte leaves and enters zinc electrode compartments.

The positive protective annular electrodes 54, 54', 58 and 58' in the zinc-bromine system illustrated in FIG. 1 may each comprise a carbon and/or graphite annular sleeve. Electrolytes will flow (arrows 19 and 21) directly through annular electrode sleeves 54' and 58' in respective manifolds 42 and 48. The typical sleeve surface 58' is sufficiently corrosion resistant to oxidize $Br^-$ to $Br_2$ over long periods of time. Current collection can be achieved via a tantalum wire current collector 64. In other systems, the wire current collector 64 can be made from other materials such as platinum or carbon, which materials may be more compatible with the particular reaction of the device. Similarly, the positive protective electrode sleeve 58' may comprise other, more compatible materials in different electrochemical reaction devices. Such materials can be selected for a zinc-bromine battery system from a wide variety of materials such as carbon, graphite, metallized carbon and ruthenized titanium. The respective inner walls 50 and 51 of the positive protective electrode sleeves 62 and 64 can be sized to be flush with the inner walls of manifolds 42 and 48, respectively. Metallized Carbon Corporation M-14 and Airco Speer Grade 580 can be used as materials for the positive electrodes. Sleeves 54 and 58 in manifolds 38 and 40, respectively, have similar requirements.

The negative protective annular electrodes 52, 52', 56 and 56' in the zinc-bromine system illustrated in FIG. 1, may have a more complicated structure than their counterpart positive protective electrodes. Electrolytes will flow (arrows 23 and 25) directly through annular electrode sleeves 52 and 56 in respective manifolds 38 and 44. The structure of a typical annular electrode 56 is shown in more detail with respect to FIG. 2.

The annular negative protective electrode 56 is comprised of an outer sleeve 70 and an inner porous liner 72. The inner wall 74 of the liner can be made to be flush with the inner wall 76 of the manifold 44 to minimize hydraulic pressure drop losses. The sleeve 70 can be comprised of carbon and/or graphite materials such as Metallized Carbon Corporation M-14 or Carbon Technologies Grade 101. Same grades of ruthenized titanium will also work.

Sleeve 70 is fed (arrow 71) a bromine-rich electrolyte, such as via a tube 78, which derives the bromine-rich electrolyte from a reservoir (not shown). The bromine-rich electrolyte is returned (arrow 73) to the reservoir via tube 82. The flow of the bromine-rich electrolyte through the sleeve 70 is for the purpose of supplying the electrolyte flowing through the annular electrode 56 into manifold 44 with bromine ions (Br−). The inner porous sleeve 72 is for the purpose of assuring that substantially only bromine ions (Br−) pass into the electrolyte, and this liner, therefore, prevents or retards the passage of the bromine-rich electrolyte proper into the electrolyte. The liner 12 is designed to pass ionic currents at low resistance.

The liner 72 can be composed of sintered, microporous polypropylene. The pores of the liner 72 can be filled with ion exchange material.

The liner 72 may be made from other microporous and ion-selective plastics and ceramics depending upon the particular chemistry of the reaction system. For example, in an electrolysis system generating oxygen and hydrogen at respective anode 14 and cathode 16 surfaces, protective electrode reactions at electrodes 52, 56, 52' and 56' could generate hydrogen, and protective electrode reactions at 54, 58, 54' and 58' could generate oxygen. Reactions at protective electrodes 56 and 56' would then introduce hydrogen in the electrolyte containing the cell system product oxygen. In a similar manner, the reactions at protective electrodes 54 and 54' would then introduce oxygen into the hydrogen product stream. In some situations, these mixtures would be undesirable, i.e., explosive mixtures could be formed. The use of a liner 72 to separate and remove these undesirable products from the system would be useful. The protective electrode reactions at electrodes 52 and 52' produce hydrogen and at electrodes 58 and 58' produce oxygen. These reactions are compatible with the system, since hydrogen and oxygen are respectively added to the electrolytes where system hydrogen and oxygen production is occurring. In this situation, there is no need for a liner 72. The composition of the liner 72 in this situation will be compatible with the electrolysis reaction.

Figure 2:
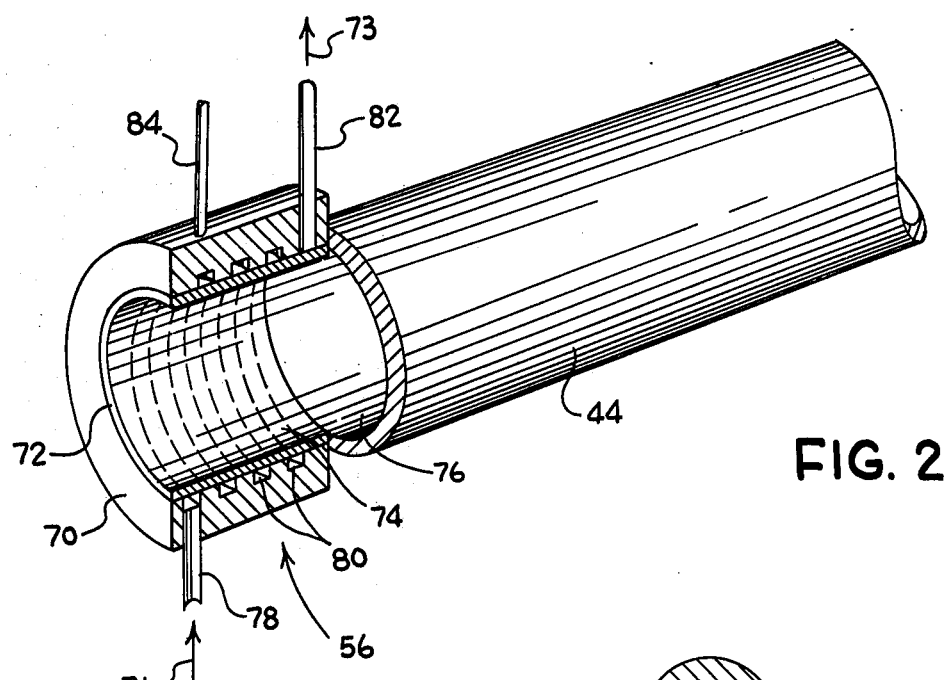
FIG. 2 depicts a perspective cut-away view of a negative protective annular electrode of this invention disposed adjacent one of the common manifolds in FIG. 1.

In the negative protective annular electrode 56 of FIG. 2, the graphite sleeve 70 is fed current via a tantalum wire 84, which current reduces $Br_2$ to $Br^-$. Other wire materials are possible as aforementioned.

In supplying the sleeve 70 with bromine-rich electrolyte, the flow may be continuous or intermittent, but must meet or exceed the stoichiometry of the electrode current.

Figure 3A:
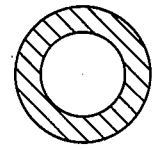
FIGS. 3a through 3d show various (but not all) possible radial cross-sectional designs for the annular electrodes of FIG. 1.
Figure 3B:
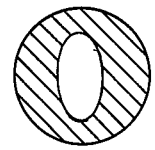
Figure 3C:
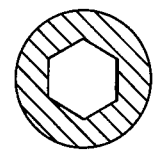
Figure 3D:
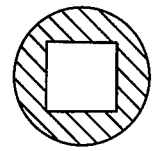

Referring to FIGS. 3a through 3d, various possible radial cross-sections for the inner wall of the annular electrodes are shown. FIG. 3a depicts the normally circular cross-section for the annular electrode. FIGS. 3b, 3c and 3d, respectively, illustrate oval, hexagonal and square geometries (not all shapes are shown here). The purpose of shaping the radial cross-section in this manner may be for several reasons: (a) to be compatible with the manifold geometrics: (b) to provide for different electrolyte flow characteristics; (c) to provide for various current density profiles along the manifold so that each cell will have its respective shunt current voltage drop matched with the voltage potential at the cell's respective position in the manifold.

Figure 4A:
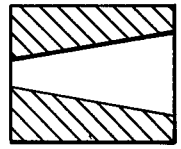
FIGS. 4a through 4c illustrate various (but not all) possible axial cross-sectional designs for the annular electrodes of FIG. 1.
Figure 4B:
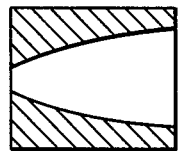
Figure 4C:
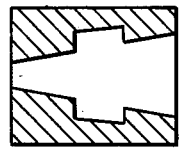

Similarly, the normally straight inner wall 74 (FIG. 2) of the annular electrodes may be designed to have a different axial cross-section as illustrated in FIGS. 4a, 4b, and 4c. FIG. 4a shows a tapered inner wall; FIG. 4b depicts a curved inner wall; and FIG. 4c illustrates an irregular-shaped inner wall. The reasons for designing the axial cross-section of the annular electrode this way are similar to, and compatible with, the aforementioned objectives.

Figure 5:
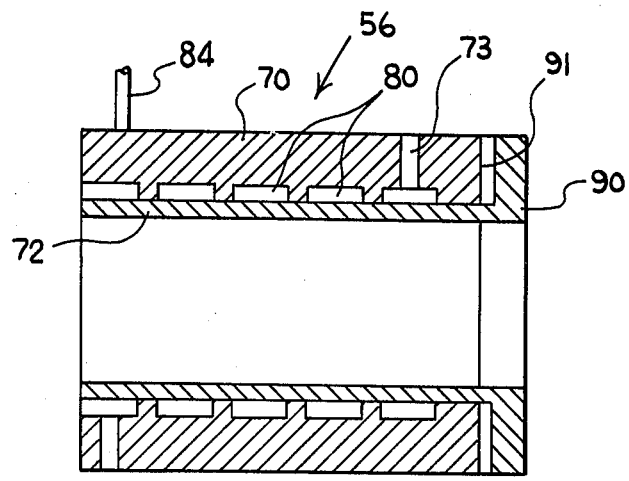
FIG. 5 illustrates a more detailed sectional view of an embodiment of the protective annular electrode shown in FIG. 2.
Figure 6:
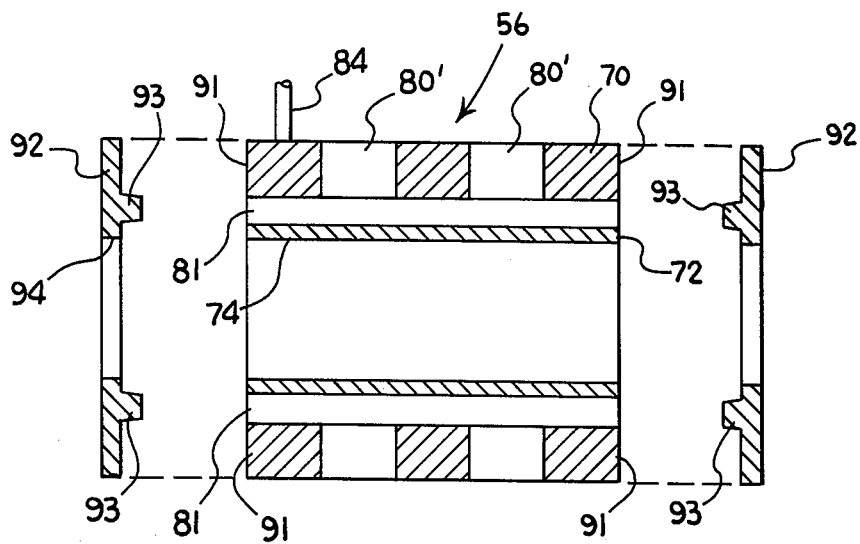
FIG. 6 depicts another more detailed sectional view of an embodiment of the protective annular electrode of FIG. 2.

Referring to FIGS. 5 and 6, two more detailed embodiments of the negative protective annular electrode 56 of FIG. 2 are shown in sectional view. The electrode 56 in FIG. 5 depicts the porous liner 72 having a non-porous annular flange member 90 disposed on its distal end. The flange member 90 is for the purpose of preventing leakage of bromine oil from the end portion 91 of the sleeve 70. The flange member 90 effectively blocks bromine oil supplied to the sleeve via channels 80 from seeping into the electrolyte from the side 91 of the sleeve.

FIG. 6 illustrates a similar embodiment to that of FIG. 5. The electrode 56 is comprised of a sleeve 70 and a liner 72 as before. The channels 80' define two wider passages that open into an axial channel 81.

The sleeve 70 is enclosed at both distal ends 91 (opposite sides) by a non-porous annular cap member 92. The cap members each have an annular plug 93 which fits into and seals the axial channel 81. The inner wall 94 of each cap 92 is made flush with the inner wall of the liner 74. The liner 72 is suspended from the sleeve 70 by structural ribs (not shown).

From the above design variations, it is meant to convey the thought that the meaning of "annular electrode" is not necessarily that type of electrode which has a straight cylindrical shape.

The aforementioned materials suggested for the electrode parts, generally pertain, and are applicable, to a zinc-bromine system. The invention is not to be construed as being limited to either a zinc-bromine system or to the particular materials selected. It will be understood by the skilled practitioner that other systems or reactions will generally require different or similar materials.

The scope and spirit of the invention is meant to encompass these obvious modifications.

Having described the invention, what is desired to be protected by Letters Patent is presented by the following appended claims:

What is claimed is:

1. A protective annular electrode for providing a substantially uniform current density along a common manifold of an electrochemical device for reducing or otherwise eliminating undesirable shunt currents in said electrochemical device, comprising:
   an annular sleeve;
   means for passing current through said sleeve;
   a first means for passing a fluid material through said sleeve;
   a second means for passing a fluid material through said sleeve; and
   an inner liner disposed within said sleeve for selectively passing a material to the exclusion of other materials.

2. The protective annular electrode of claim 1, further comprising means for passing a fluid material to and from said liner via said sleeve.

3. The protective annular electrode of claim 2, wherein said liner selectively passes ions from a fluid material supplied to said sleeve to an electrolyte in contact with said liner.

4. The protective annular electrode of claim 2, wherein said liner selectively passes ions from an electrolyte passing through said liner to a fluid material being supplied to said sleeve.

5. The protective annular electrode of claim 2, wherein said means for passing fluid material to and from said liner via said sleeve are means defining at least one fluid channel in said sleeve.

6. The protective annular electrode of claim 1, further comprising an annular cap disposed at an end of said sleeve and liner.

7. The protective annular electrode of claim 6, wherein there are two annular caps, each cap disposed on an opposite end of said sleeve and liner.

8. The protective annular electrode of claim 6, wherein said liner is porous and said cap is non-porous.

9. The protective annular electrode of claim 1, wherein said liner has a flange disposed on one end thereof.

10. The protective annular electrode of claim 9, wherein said liner is porous and said flange is non-porous.

11. The protective annular electrode of claim 1, wherein said electrode is a negative protective electrode.

12. The protective annular electrode of claim 1, wherein said electrode is a positive protective electrode.

13. The protective annular electrode of claim 1, wherein said liner is porous.

14. The protective annular electrode of claim 1, in combination with an electrolyte carrying manifold.

15. The protective annular electrode of claim 1, wherein said liner is in fluidic contact with an electrolyte.

16. The protective annular electrode of claim 1, wherein said liner is selected from a group of materials consisting of: microporous and ion-selective plastics and ceramics.

17. The protective annular electrode of claim 1, wherein said sleeve is selected from at least one of a group of materials consisting of: carbon, graphite, metallized carbon and ruthenized titanium.

* * * * *